United States Patent [19]

Minoura et al.

[11] 4,256,364
[45] Mar. 17, 1981

[54] TWO-DIMENSIONAL SCANNING OPTICAL SYSTEM WITH DISTORTION CORRECTION

[75] Inventors: Kazuo Minoura, Yokohama; Masamichi Tateoka, Kawasaki; Setsuo Minami, Yokohama, all of Japan

[73] Assignee: Canon Kabushiki Kaisha, Tokyo, Japan

[21] Appl. No.: 11,859

[22] Filed: Feb. 13, 1979

[30] Foreign Application Priority Data

Feb. 20, 1978 [JP] Japan ................................. 53-18349

[51] Int. Cl.³ .............................................. G02B 27/17
[52] U.S. Cl. ........................................ 350/6.9; 350/6.91
[58] Field of Search ............................. 350/6.5–6.91, 350/285, 6.1–6.4; 358/206, 208; 250/235, 236

[56] References Cited

U.S. PATENT DOCUMENTS 3,733,979  5/1973  England ............................ 350/6.91
4,054,361  10/1977  Noguchi ............................ 350/6.8

FOREIGN PATENT DOCUMENTS 2640282  3/1978  Fed. Rep. of Germany ............ 350/6.9

*Primary Examiner*—Jon W. Henry
*Attorney, Agent, or Firm*—Fitzpatrick, Cella, Harper & Scinto

[57] ABSTRACT

A two-dimensional scanning optical system comprising a deflector capable of two-dimensional deflection of a light beam in two mutually orthogonal directions, an imaging lens system provided with a predetermined distortion characteristic and capable of focusing the light beam deflected by said deflector onto a plane to be scanned, and a light source for introducing said light beam into said deflector in a direction parallel to the optical axis of said imaging lens system, thereby achieving a scanning on said plane with substantially linear scan lines.

7 Claims, 11 Drawing Figures

TWO-DIMENSIONAL SCANNING OPTICAL SYSTEM WITH DISTORTION CORRECTION

BACKGROUND OF THE INVENTION

1. Field of the Invention

The present invention relates to a scanning optical system capable of a two-dimensional scanning.

2. Description of the Prior Art

In FIG. 1 there is schematically shown a scanning optical system comprising a reflecting surface 1 as a deflector capable of independent rotational movement about two orthogonal axes X and $Y_M$ to achieve a two-dimensional scanning, wherein the light beam 2 deflected by said deflecting surface 1 is focused by an imaging lens 3 onto a plane 4 to be scanned. In this illustration it is assumed that the axis $Y_M$ is parallel to said deflecting surface 1 and is orthogonal to a fixed axis X which is orthogonal to the optical axis of said imaging lens 3. It is further assumed that the reflecting surface 1 is in a standard rotational position with respect to said rotational axes X and $Y_M$ when said surface 1 is perpendicular to the optical axis 5 of said imaging lens 3, and that a beam deflection in the direction of axis X' on said plane 4 caused by a rotation of said reflecting surface 1 about the axis $Y_M$ is defined as a principal deflection with a principal deflection angle $W_1$ while a deflection in the direction of axis Y' on said plane 4 caused by a rotation of said reflecting surface 1 about the axis X is defined as an auxiliary deflection with an auxiliary deflection angle $W_2$.

It is now assumed that the optical system shown in FIG. 1 utilizes an ordinary f·tanθ lens which focuses a parallel beam entering said lens with an angle θ to the optical axis thereof at a position distant from said optical axis by $y = f \cdot \tan\theta$, and that said optical system receives a light beam parallel to said axis X. Now let us consider the following scanning cases of:

(1) The principal deflection angle is maintained constant ($W_{1c}$, $-W_{1c}$) while the auxiliary deflection angle $W_2$ is changed ($-W_{2c} \leq W_2 \leq W_{2c}$), i.e.

$$W_1 = W_{1c}, \quad -W_{2c} \leq W_2 \leq W_{2c}; \quad (i)$$

or $$(ii) \quad W_1 = -W_{1c}, \quad -W_{2c} \leq W_2 \leq W_{2c}; \quad (ii)$$

(2) The auxiliary deflection angle $W_2$ is maintained constant ($W_{2c}$, $-W_{2c}$) while the principal deflection angle $W_1$ is changed ($-W_{1c} \leq W_1 \leq W_{1c}$), i.e.

$$W_2 = W_{2c}, \quad -W_{1c} \leq W_1 \leq W_{1c}; \quad (iii)$$

$$W_2 = -W_{2c}, \quad -W_{1c} \leq W_1 \leq W_{1c} \quad (iv)$$

As shown in FIG. 2, the beam trajectories on said plane to be scanned 4 corresponding to the abovementioned conditions (i), (ii), (iii) and (iv) become spool-shaped. More specifically, though the principal scan lines (beam trajectories formed in the principal scanning) are linear, the auxiliary scan lines (beam trajectories formed in the auxiliary scanning) become curved. Also the scan lines are not equally pitched even when the auxiliary deflection angle $W_2$ is changed linearly in time.

Now, when the optical system shown in FIG. 1 receives an incident light beam parallel to the axis Y, the beam trajectories corresponding to the above-mentioned conditions (i), (ii), (iii) and (iv) on the plane to be scanned become spool-shaped as shown in FIG. 3, in which case the auxiliary scan lines become linear while the principal scan lines become curved.

Thus, as explained in the foregoing, the shape of the principal scan lines on the plane to be scanned is inevitably different from that of the auxiliary scan lines regardless whether the incident light beam is introduced parallel to the axis X or to the axis Y of the reflecting surface 1.

In case the imaging lens is composed of spherical lenses, the effect of correction of image distortion achievable by such spherical lenses appears isotropically both in the principal and auxiliary scanning directions. It is therefore necessary to achieve an optical scanning system capable of reproducing the principal and auxiliary scan lines in the same form on the plane to be scanned.

SUMMARY OF THE INVENTION

The object of the present invention, therefore, is to provide a two-dimensional scanning optical system in which a light beam two-dimensionally deflected by a single reflecting surface is focused onto a plane to be scanned by means of a spherical lens system, said scanning system being designed to generate a distortion of the same form both in the principal scanning direction and in the auxiliary scanning direction on said plane to be scanned.

Another object of the present invention is to provide a scanning optical system as explained above, wherein the distortion of the scan lines on the plane to be scanned is satisfactorily corrected.

In order to achieve the above-mentioned objects, the two-dimensional scanning optical system of the present invention comprises a deflector provided with a deflecting surface capable of deflecting a light beam independently in two mutually orthogonal directions, an imaging spherical lens system capable of focusing the light beam deflected by said deflector onto a plane to be scanned, and a light source for introducing the light beam into said deflector in a direction parallel to the optical axis of said imaging lens system.

Also in the two-dimensional scanning system of the present invention, the above-mentioned imaging lens system is intentionally provided with a determined distortion aberration to achieve a two-dimensional scanning with a reduced distortion.

BRIEF DESCRIPTION OF THE DRAWINGS

FIG. 11 is a view showing the state of scan lines obtainable with an embodiment of the imaging lens to

DESCRIPTION OF THE PREFERRED EMBODIMENTS

Figure 1:
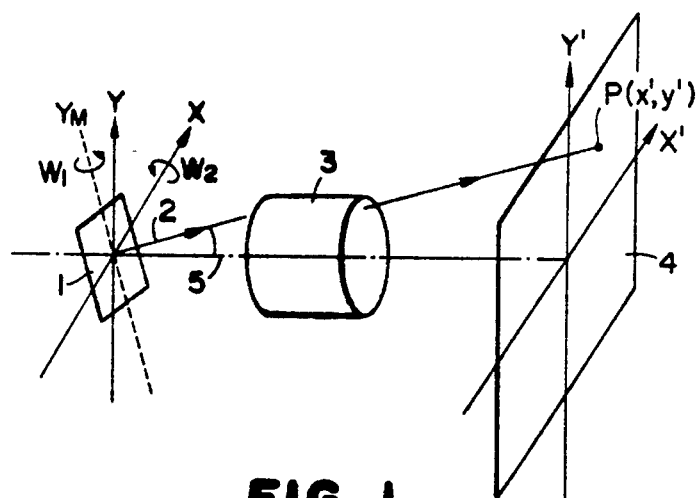
FIG. 1 is a schematic drawing showing a conventional two-dimensional scanning optical system.
Figure 2:
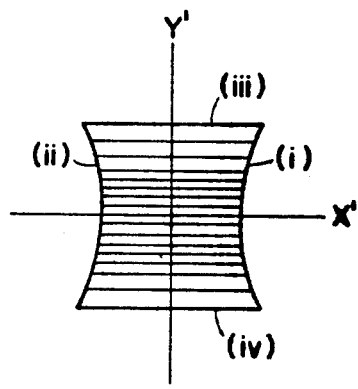
FIGS. 2 and 3 are views showing undesired states of scan lines obtainable with the scanning optical system shown in FIG. 1.
Figure 3:
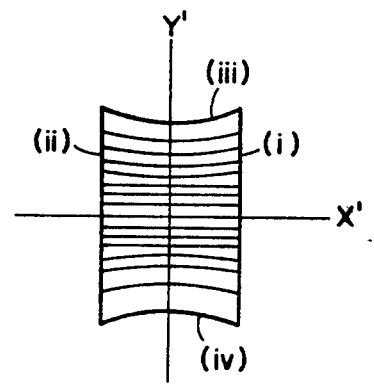
Figure 4:
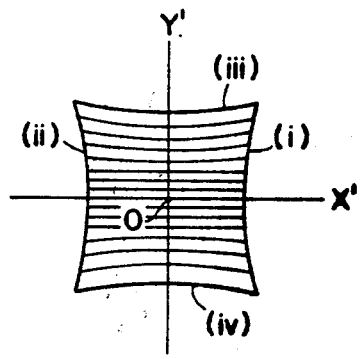
FIGS. 4 and 5 are views showing the states of scan lines obtainable with the two-dimensional scanning optical system of the present invention.

In the above-mentioned optical system of FIG. 1, the scan lines on the plane 4 to be scanned assume the form shown in FIG. 4 when the incident beam to the deflecting surface 1 is introduced parallel to the optical axis 5 and, after reflection by said surface, focused onto said plane 4 by means of an imaging lens 3 of a f·tanθ characteristic. As will be apparent from FIG. 4, the form of the scanning beam trajectory on said plane is the same for the principal scanning line and for the auxiliary scanning line around the original point O when the beam is introduced along the optical axis of the imaging lens. Stated differently the distortion aberration at a given distance from the original point O is always the same. Consequently in an ordinary scanning system utilizing spherical lenses in the imaging lens system, it is possible to correct such distortion aberration by modifying the lens shapes while maintaining the spherical character of the lens surfaces.

In the following is explained the correction of the scan line into a linear form without distortion by intentionally providing said imaging lens with a determined distortion aberration. As it is theoretically impossible to obtain all the scan lines in a completely linear form in the above-explained two-dimensional scanning system as long as the imaging lens system is composed of spherical lenses, the scan lines are represented by curves as close as possible to linear lines and the distortion aberration of the imaging lens system is determined as a function of the shape of said curves.

Figure 5:
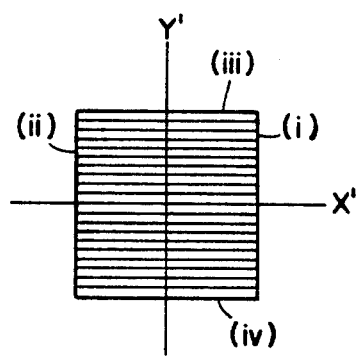

According to the present invention it is found that the use of a so-called f·θ lens as said imaging lens system enables to correct the spool-shaped scan lines as shown in FIG. 4 thus realizing linear principal and auxiliary scan lines as shown in FIG. 5, and that the auxiliary scan lines can be rendered equal-pitched by the use of a deflecting surface providing an auxiliary deflection with a constant angular velocity. The abovementioned f·θ lens is defined as a lens capable of focusing a parallel beam entering with an incident angle θ onto a position distanced by y=f·θ from the optical axis on the focal plane, wherein f is the focal length of said lens. In the following shown in the analysis of the optical system utilizing such f·θ lens, while making reference again to FIG. 1.

Expressing the angles of rotation of the deflecting mirror 1 around the axis $Y_M$ parallel to said mirror surface and around the axis X respectively by $W_1$ and $W_2$, the direction cosine (lM, mM, nM) of the normal line to said mirror 1 can be represented as follows:

$$lM = -\sin W_1 \qquad (1)$$
$$mM = -\cos W_1 \cdot \sin W_2$$
$$nM = \cos W_1 \cdot \cos W_2$$

Assuming that the incident light beam is introduced parallel to the optical axis 5 of the imaging lens 3, the direction cosine (l', m', n') of the beam reflected by said mirror 1 can be represented as follows:

$$l' = -\sin 2W_1 \cdot \cos W_2 \qquad (2)$$
$$m' = -\cos^2 W_1 \cdot \sin 2W_2$$
$$n' = 2\cos^2 W_1 \cdot \cos^2 W_2 - 1$$

The angle θ between said reflected beam and the optical axis can be represented as follows:

$$\theta = \cos^{-1}(n') = \cos^{-1}(2\cos^2 W_1 \cdot \cos^2 W_2 - 1) \qquad (3)$$

Thus the image height Y' obtainable by such f·θ lens is:
$$Y' = f\cdot\theta = f\cdot\cos^{-1}(2\cos^2 W_1 \cdot \cos^2 W_2 - 1) \qquad (4)$$

The coordinates (x', y') of said image are represented as follows:

$$x' = Y' \cdot \sin(\tan^{-1}(l'/m')) \qquad (5)$$
$$= f \cdot \cos^{-1}(2\cos^2 W_1 \cdot \cos^2 W_2 - 1) \cdot$$
$$\sin(\tan^{-1}(\sin 2W_1 \cdot \cos W_2/\cos^2 W_1 \cdot \sin 2W_2))$$

$$y' = Y' \cdot \cos(\tan^{-1}(l'/M')) \qquad (6)$$
$$= f \cdot \cos^{-1}(2\cos^2 W_1 \cdot \cos^2 W_2 - 1) \cdot$$
$$\cos(\tan^{-1}(\sin 2W_1 \cdot \cos W_2/\cos^2 W_1 \cdot \sin 2W_2))$$

If
$$W_1 = 0, \text{ then:}$$
$$x' = 0$$
$$y' = f\cdot(2W_2)$$

so that y' is proportional to $W_2$. Thus the scanning speed on the axis Y' on the plane 4 becomes constant if the deflection about the axis X is achieved with a constant angular velocity. Also if $W_2 = 0$, then:
$$x' = f\cdot(2W_1)$$
$$y' = 0$$

so that x' is proportional to $W_1$. Thus the scanning speed on the axis X' on the plane 4 becomes constant if the deflection about the axis $Y_M$ is achieved with a constant angular velocity.

Thus a constant scanning speed can be obtained on the axes Y' and X' if the incident beam is parallel to the optical axis and the deflecting angular velocity about the axes X and $Y_M$ are made constant. Therefore the signals equally spaced in time and applied to the incident beam will be equally spaced along the axes Y' and X' on the plane to be scanned.

Although the foregoing explanation deals with the scanning on the orthogonal axes, in the following there will be considered scanning on an arbitrary linear scan line not lying on such orthogonal axes.

Figure 6:
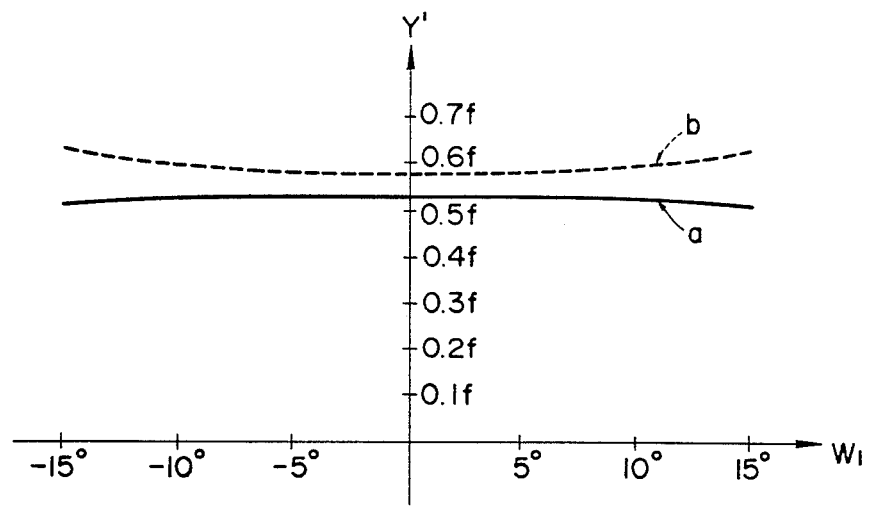
FIGS. 6 and 7 are views showing the states of scan lines obtainable through an imaging lens of a particular distortion characteristic to be employed in the two-dimensional scanning optical system of the present invention.

It is assumed that the angle of rotation about the axis X is maintained at a constant value of $W_{2c}$, while the deflecting angle $W_1$ about the axis $Y_M$ is varied within a range of $-W_{1c} \leq W_1 \leq W_{1c}$. In such case the beam deflected by the mirror 4 does not lie in a flat plane but scans along a conical surface. Such beam, if focused by an ordinary f·tan θ lens without distortion, will result in a spool-shaped image as shown in FIG. 4, in the manner as already explained in the foregoing. However the use of the aforementioned f·θ lens will enable to obtain a satisfactorily corrected rectangular image as shown in FIG. 5. The curve b in FIG. 6 shows the form of a scan line obtainable by a scanning under the conditions of $W_{2c} = 15°$ and $-15° \leq W_1 \leq 15°$ in combination with a distortionless lens (Y' = f·tan θ), while the curve a represents the form of a scan line obtainable with an f·θ lens under the same scanning conditions. These results clearly show that an improved scan line close to a straight line can be obtained by the use of the above-mentioned f·θ lens.

Now in the following there will be shown an embodiment of the lens provided with determined distortion characteristic for improving the linearity of the scan lines.

For example in case of adjusting the value y' on two points at $W_1=0$ and at $W_1=W_{1c}$ to a same value of $y_c'$ on a scanning line obtained by varying the principal deflection angle $W_1$ while maintaining the auxiliary deflection angle $W_2$ at a constant value $W_{2c}$, the image height Y' obtainable by a lens with the above-mentioned distortion characteristic can be given by the following equation, instead of the foregoing equation (4):

$$Y' = f(\theta + k_3\theta^3 + k_5\theta^5) \quad (7)$$

wherein $\theta$ is given by the foregoing equation (3) while the constants $k_3$ and $k_5$ can be obtained from the following equation system:

$$y_c' = f\{(2W_{2c}) + k_3(2W_{2c})^3 + k_5(2W_{2c})^5\}$$
$$y_c' = f\{\{\cos^{-1}(2\cos^2 W_{1c} \cdot \cos^2 W_{2c} - 1)\}$$
$$+ k_3\{\cos^{-1}(2\cos^2 W_{1c} \cdot \cos^2 W_{2c} - 1)\}^3$$
$$+ k_5\{\cos^{-1}(2\cos^2 W_{1c} \cdot \cos^2 W_{2c} - 1)\}^5]$$
$$\cdot \cos\{\tan^{-1}(\sin 2W_{1c} \cdot \cos W_{2c}/\cos^2 W_{1c} \cdot \sin 2W_{2c})\}$$

The distorted lens of which image height is given by the equation (7) has the following third- and fifth-order distortion aberration coefficient $V$, $\hat{V}$:

$$V = 2(\tfrac{1}{3} - k_3)$$

$$\hat{V} = 8(k_3 - k_5 - 1/5)$$

Thus it is rendered possible to achieve a better linearity than with the aforementioned f·θ lens by the use of a scanning lens or a distortion characteristic satisfying the above-explained conditions for the third- and fifth-order distortion aberration coefficients.

For example by solving the above-mentioned equation system for the conditions of $W_{2c}=5°$ and $W_{1c}=5°$, there can be obtained:

$$k_3 = -0.042$$

$$k_5 = 1.38$$

so that:

$$V = 0.7507$$

$$\hat{V} = -12.976$$

Figure 7:
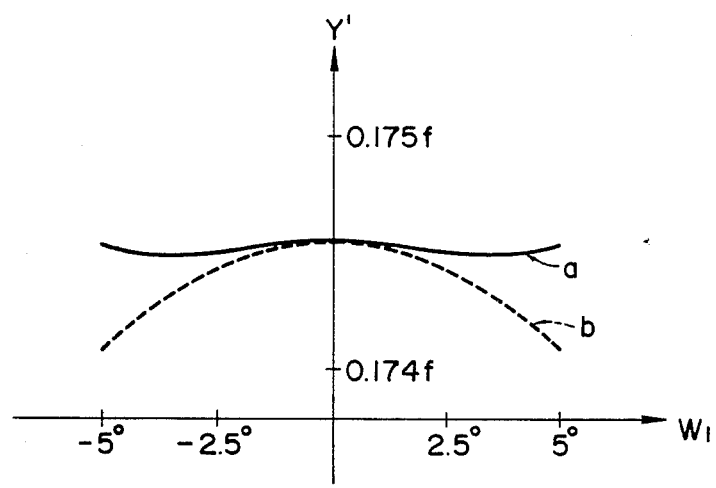

FIG. 7 shows the calculated positions y' of the scan line under the conditions of $W_{2c}=5°$ and $-5° \leq W_1 \leq 5°$, wherein the curves a and b respectively stand for the scan lines obtainable with the above-explained distorted lens and with the f·θ lens.

Figure 8:
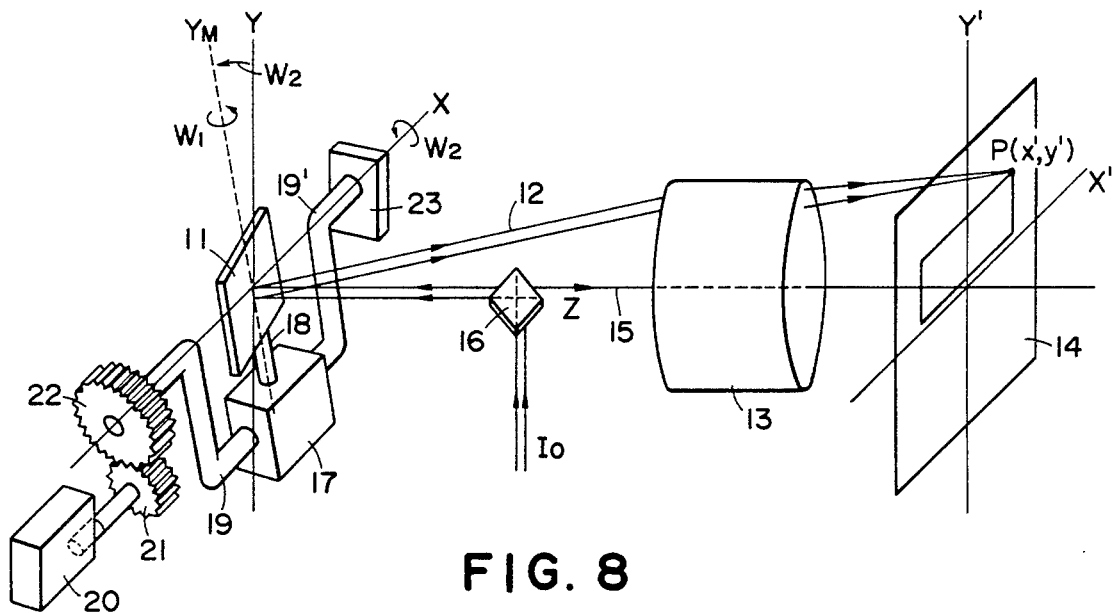
FIGS. 8, 9 and 10 are schematic perspective views of embodiments of the two-dimensional scanning optical system of the present invention.

An embodiment of the two-dimensional scanning apparatus of the present invention is shown, in a perspective view, in FIG. 8, in which the deflector, having mutually orthogonal rotating axes X, $Y_M$, receives an incident beam $I_o$ from an unrepresented light source which is guided from the side of a scanning imaging lens 13 through a mirror 16 toward a scanning mirror 11 and in a direction parallel to the optical axis of said imaging lens 13. The deflected beam 12 reflected by said scanning mirror 11 and having the aforementioned direction cosine (l', m', n') enters said imaging lens 13 of an f·θ characteristic and focused on a point P(x', y') on a photosensitive member 14 constituting the plane to be scanned.

The above-mentioned deflector is composed of a scanning mirror 11 which is mounted on a drive system 17 for causing a rotation about the axis $Y_M$ through a shaft 18 parallel to said axis $Y_M$, a connecting system 19 adapted to rotate about the axis X perpendicular to said axis $Y_M$ and connected at an end thereof to said drive system 17 and at the other end thereof to a gear 22 for transmitting the driving force from a drive system 20 to cause rotation about said axis X, and another connecting system 19' pivotably supported at an end thereof on the crossing point of said axis X with a support plate 23 and fixed at the other end thereof to said drive system 17.

A two-dimensional deflection (angle $W_1$ about the axis $Y_M$ and angle $W_2$ about the axis X) performed by the above-mentioned deflector in combination with the above-mentioned f·θ lens will provide a substantially linear scan lines on said photosensitive member 14. In this case it is assumed that said f·θ is provided with distortion aberration coefficients of $V = \tfrac{2}{3}$ and $\hat{V} = -8/5$.

The above-explained scanning system is also usable as a read-out system if said photosensitive member 14 is replaced by a medium storing an image information.

In the embodiment shown in FIG. 8, the beam 12 reflected by the mirror 11 is partially hindered by the mirror 16 and cannot reach the plane 14 to be scanned if said mirror 16 is totally reflective. Consequently in such embodiment the imaging lens 13 should be provided with a satisfactory angular characteristic or with a long focal distance in order to obtain a wide scanning area.

Figure 9:
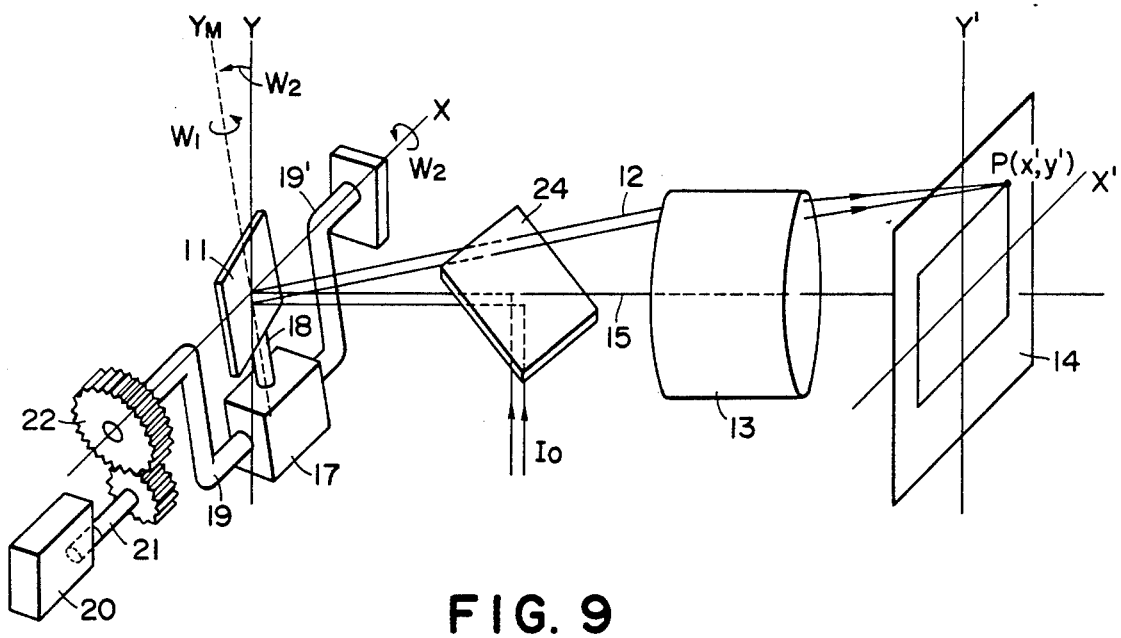

FIG. 9 shows, in a perspective view, another embodiment of the present invention wherein said mirror 16 is replaced by a half-mirror 24 for obtaining a wider scanning area than in the embodiment shown in FIG. 8. The embodiment shown in FIG. 9 enables to obtain a wider scanning area with a distorted optical system 13 of a relatively short focal distance, though the imaging energy brought to the plane 14 is somewhat reduced.

Figure 10:
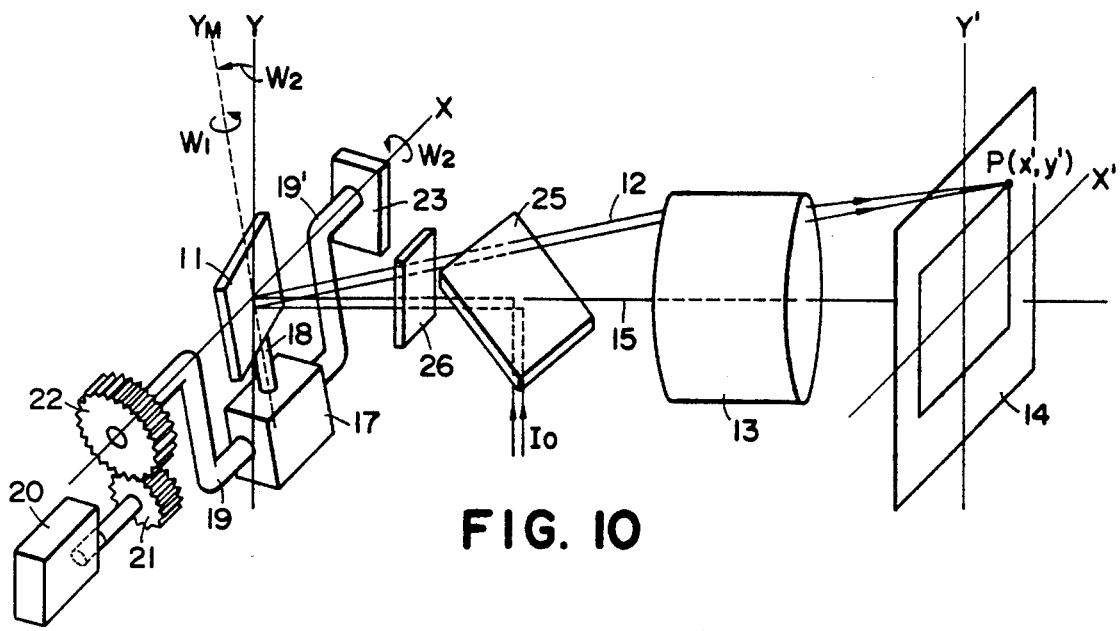

FIG. 10 shows, in a perspective view, still another embodiment of the optical system of the present invention, which enables to obtain a wider scanning area with an imaging lens 13 of a relatively short focal length and without such loss in the imaging energy through the use of a polarizing beam splitter 25 and a λ/4 plate 26. A light beam from an unrepresented light source is linearly polarized and reflected by a polarizing beam splitter 25 into a direction parallel to the optical axis 15. Said beam $I_o$ passes through a λ/4 plate 26, is then reflected by a deflecting mirror 11 and passes again through said plate 26 whereby the direction of polarization of thus reflected beam is rendered perpendicular to the direction of polarization of said beam $I_o$. If said polarizing beam splitter 25 is so selected as to respectively reflect and transmit mutually perpendicular polarized beams, the above-mentioned reflected beam is transmitted by said polarizing beam splitter 25 and is directed to the plane to be scanned. In such embodiment the scanning can be achieved more efficiently than in the preceding embodiment utilizing the half mirror 24 since the loss of imaging energy at the scanning plane can be avoided. The above-mentioned λ/4 plate 26 can be composed, as already known, of a double refractive material such as quartz or calcite cut into a suitable thickness and a suitable crystalline direction. Also the polarizing beam splitter can be easily obtained by multi-layered evaporation.

In the following is shown the data of an f·θ lens provided with a third-order distortion aberration of $V=0.60346$ and a fifth-order distortion aberration $\hat{V}=-0.23842$ as an example of the imaging lens 13 to be employed in the foregoing embodiment.

TABLE 1

Figure 11:
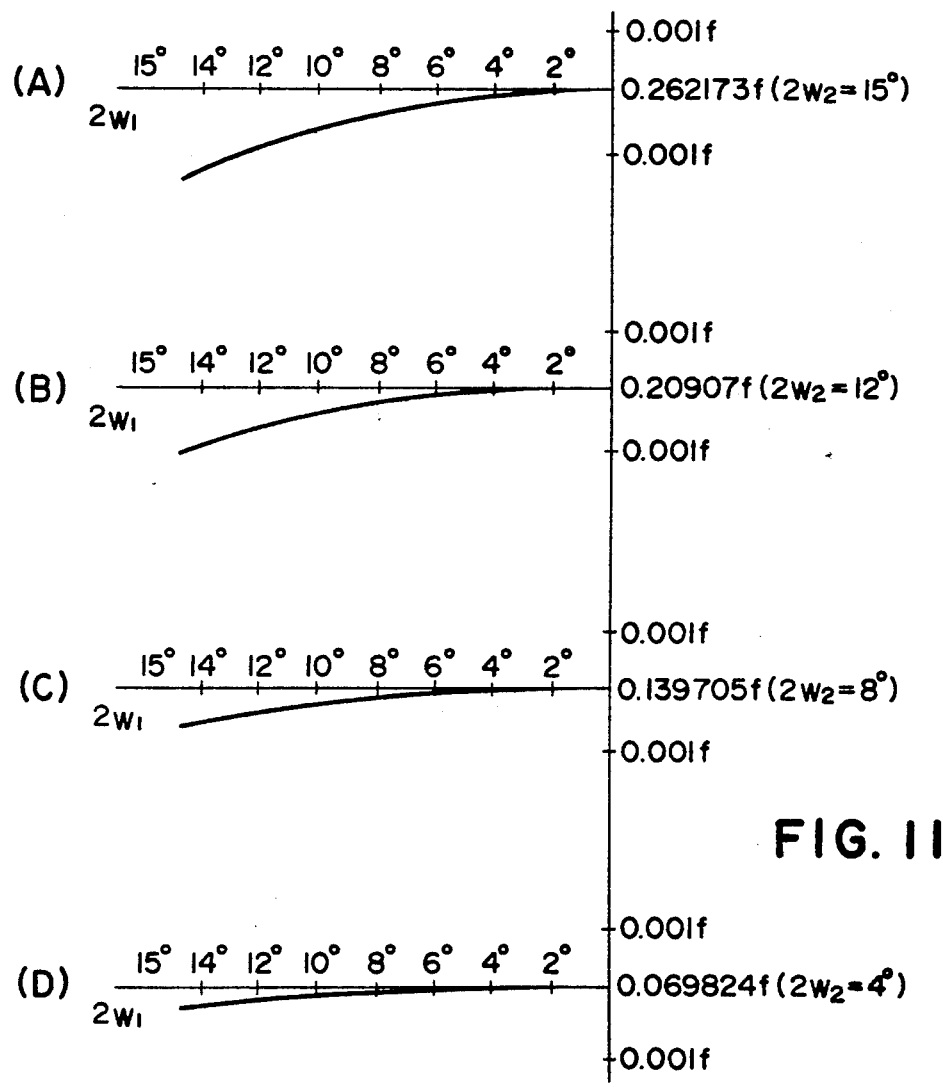

| | Lens data | | |
|---|---|---|---|
| Face | R | D | N |
| 1 | 0 | 0.113474 | 1.0 |
| 2 | −0.437877 | 0.020603 | 1.51462 |
| 3 | 0.59169 | 0.046725 | 1.0 |
| 4 | 1.314566 | 0.035221 | 1.79883 |
| 5 | −0.381897 | | 1.0 | wherein R is the radius of curvature, D is the distance or thickness of lens on the optical axis, and N is the refractive index. The data shown in Table 1 are normalized for the focal length f=1, in which case the lens back Sk' is 1.13927. FIGS. 11(a), (b), (c) and (d) show the states of scan lines for various auxiliary deflection angle (2W$_2$) obtainable with the imaging lens shown in Table 1.

What we claim is:

1. A two-dimensional scanning optical system, comprising:
   a deflector for two-dimensionally deflecting a beam in two mutually orthogonal directions;
   a spherical imaging optical system adapted to focus the beam deflected by said deflector onto a plane to be scanned and provided with a distortion aberration for obtaining a linear trajectory of said beam on said plane; and
   beam supply means for introducing said beam into said deflector in such a manner that the beam trajectory on said plane is affected by said distortion aberration of said imaging optical system equally in mutually orthogonal directions.

2. A two-dimensional scanning optical system according to claim 1, wherein said beam supply means is adapted to introduce said beam into said deflector in a direction parallel to the optical axis of said imaging optical system.

3. A two-dimensional scanning optical system according to claim 2, wherein said imaging optical system is provided with a third-order distortion aberration coefficient V and a fifth-order distortion aberration coefficient $\hat{V}$ approximately defined by:

$$V = 2(\tfrac{1}{3} - k_3);\ \hat{V} = 8(k_3 - k_5 - 1/5);$$

wherein $k_3$ and $k_5$ are determinable from the following equation system:

$$y_c' = f[2W_{2c} + k_3(2W_{2c})^3 + k_5(2W_{2c})^5]$$
$$y_c' = f[\cos^{-1}(2\cos^2 W_{1c}\cos^2 W_{2c} - 1)$$
$$+ k_3\{\cos^{-1}(2\cos^2 W_{1c}\cos^2 W_{2c} - 1)\}^3$$
$$+ k_5\{\cos^{-1}(2\cos^2 W_{1c}\cos^2 W_{2c} - 1)\}^5] \cdot$$
$$\cos\{\tan^{-1}(\sin 2W_{1c}\cos W_{2c}/\cos^2 W_{1c}\sin 2W_{2c})\}$$

wherein f is the focal length of said imaging optical system, $W_{1c}$ is a determined deflection angle of said deflector in a principal deflecting direction, $W_{2c}$ is a determined deflection angle of said deflector in an auxiliary deflecting direction, and $y_c'$ is a determined image height on said plane to be scanned.

4. A two-dimensional scanning optical system according to claim 2, wherein said imaging optical system is provided with a third-order distortion aberration V equal to $\tfrac{2}{3}$ and a fifth-order distortion aberration $\hat{V}$ equal to −8/5.

5. A two-dimensional scanning optical system comprising:
   a deflector for two-dimensionally deflecting a beam into two mutually orthogonal directions;
   a spherical imaging optical system adapted to focus the beam deflected by said deflector onto a plane to be scanned and provided with a distortion aberration for obtaining a linear trajectory of said beam on said plane; and
   beam supply means for introducing said beam into said deflector, said means comprising an optical member positioned between said plane and said deflector and adapted to render the incident beam parallel to the optical axis of said imaging optical system.

6. A two-dimensional scanning optical system according to claim 5, wherein said optical member is a half-mirror.

7. A two-dimensional scanning optical system according to claim 5, wherein said optical member is a polarizing beam splitter, and further comprising a phase plate provided with different refractive indexes in mutually orthogonal directions and positioned between said polarizing beam splitter and said deflector.

* * * * *